Nov. 18, 1969  E. H. LAND  3,478,660
PHOTOGRAPHIC APPARATUS WITH FLASH EXPOSURE CONTROL SYSTEM
Filed Sept. 29, 1966  2 Sheets-Sheet 1

INVENTOR.
Edwin H. Land
BY
Brown and Mikulka
and
John H. Coult
ATTORNEYS

United States Patent Office 3,478,660
Patented Nov. 18, 1969

3,478,660
PHOTOGRAPHIC APPARATUS WITH FLASH
EXPOSURE CONTROL SYSTEM
Edwin H. Land, Cambridge, Mass., assignor to Polaroid
Corporation, Cambridge, Mass., a corporation of
Delaware
Filed Sept. 29, 1966, Ser. No. 582,973
Int. Cl. G03b 9/70
U.S. Cl. 95—11.5
9 Claims

ABSTRACT OF THE DISCLOSURE

A photographic camera having a variable diaphragm and a control member coupled to the diaphragm for varying the exposure aperture of the diaphragm. The camera is also provided with an exposure mechanism including a flash unit, an adjustable element which is positioned in accordance with the range of the subject to be photographed, and an actuating device for actuating the exposure mechanism at the various settings of the diaphragm. The actuating device is slideably mounted in the camera and is automatically positioned for effecting a proper exposure of the film by the camera in response to the setting of the adjustable element. As the control member for the diaphragm is manually set to an appropriate aperture setting for an exposure, the control member cooperates with the actuating device to thereby actuate the exposure mechanism.

---

Figure 1:
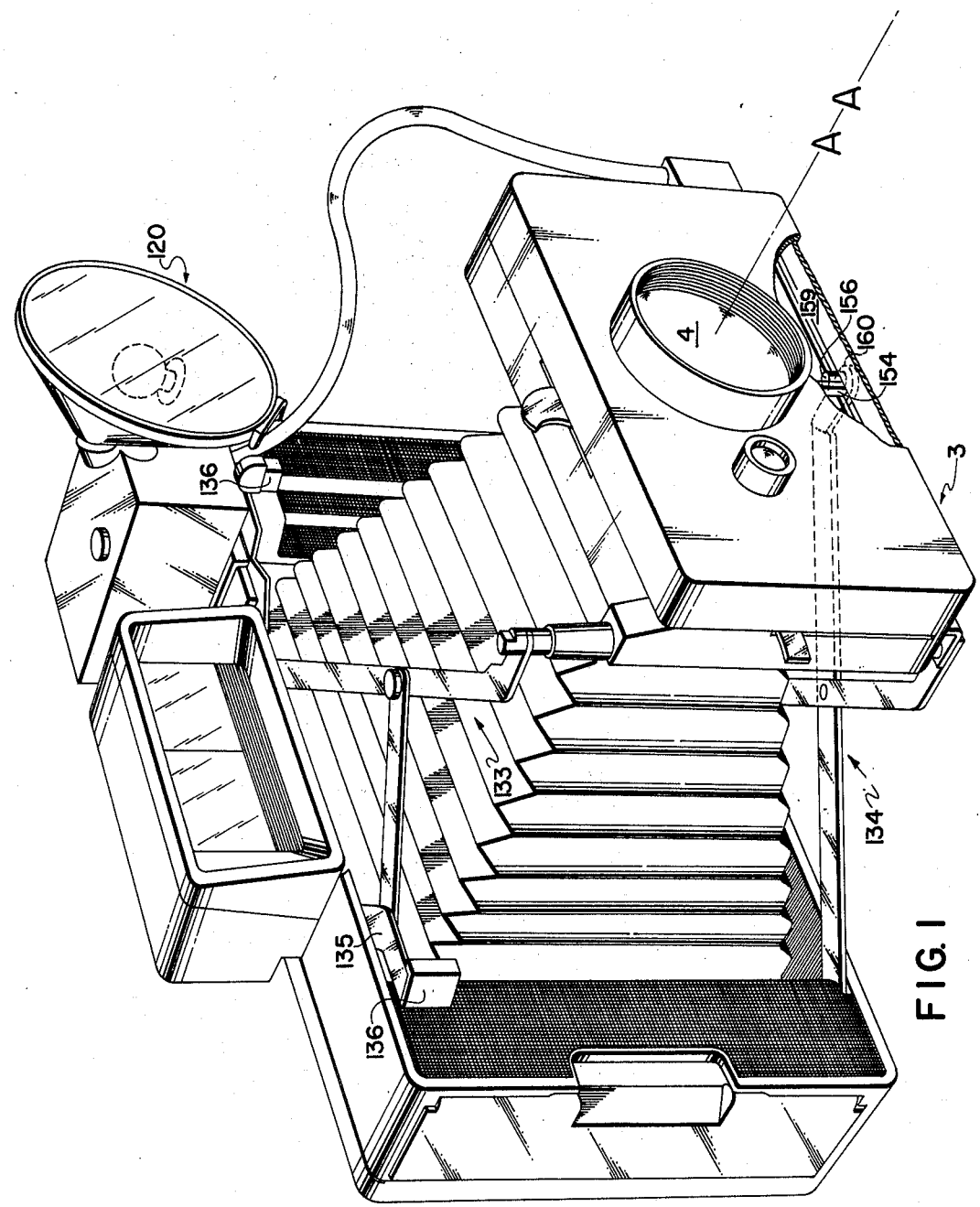

This invention relates to photographic apparatus and more particularly to a range-responsive flash exposure control system for photographic apparatus.

Exposure control systems have been devised wherein the actuation of shutter means contained therein is rendered a function of the effective exposure aperture. For example, such an exposure control system may comprise a pair of diaphragm blades progressively variable in response to movement to a control member. A photoresponsive shutter control means, receiving ambient light in accordance with the relative positive of the diaphragm blades, trips the shutter at an effective aperture which is appropriate for the level of ambient illumination and for the shutter speed and photosensitive material employed.

For such a system to be particularly useful for photoflash applications, it should be possible to trip the shutter independently of the ambient light level. It is desirable in flash photography to vary the effective exposure aperture directly with the range of the subject; i.e., the effective aperture at great subject distances should be larger than at lesser subject distances.

This invention concerns the provision in a camera of means in a flash exposure control system, as described above, for coordinating the effective exposure aperture at which the film material is exposed with the ranged distance to the subject being photographed.

Accordingly, it is an object of this invention to provide in a camera having an exposure control system as described above means for coordinating the effective exposure aperture at which a flash exposure is made with the range of the subject to be photographed. It is another object to provide such means which is simple in structure and operation and which is highly accurate and relatively inexpensive to produce.

It is a further object of this invention to provide in a variable focus camera, adjustable switching means responsive to focus adjustments and to variations in the effective exposure aperture for initiating a flash exposure at an effective aperture dependent upon the particular focus setting.

Briefly, the invention may most advantageously be implemented in photographic apparatus having diaphragm means variable in response to movement of a control member and shutter means actuated automatically in ambient light upon establishment by the diaphragm means of an effective exposure aperture appropriate for the scene brightness and the shutter speed and photosensitive material employed. For photoflash applications, such apparatus may employ means for tripping the shutter and firing flash apparatus in response to the closing of switch means. A switch member is provided which is adjustably positioned in response to range settings in the apparatus to effect a closing of such switch means upon the selection of an effective exposure aperture appropriate for the ranged subject distance.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which is indicated in the claims.

Figure 2:
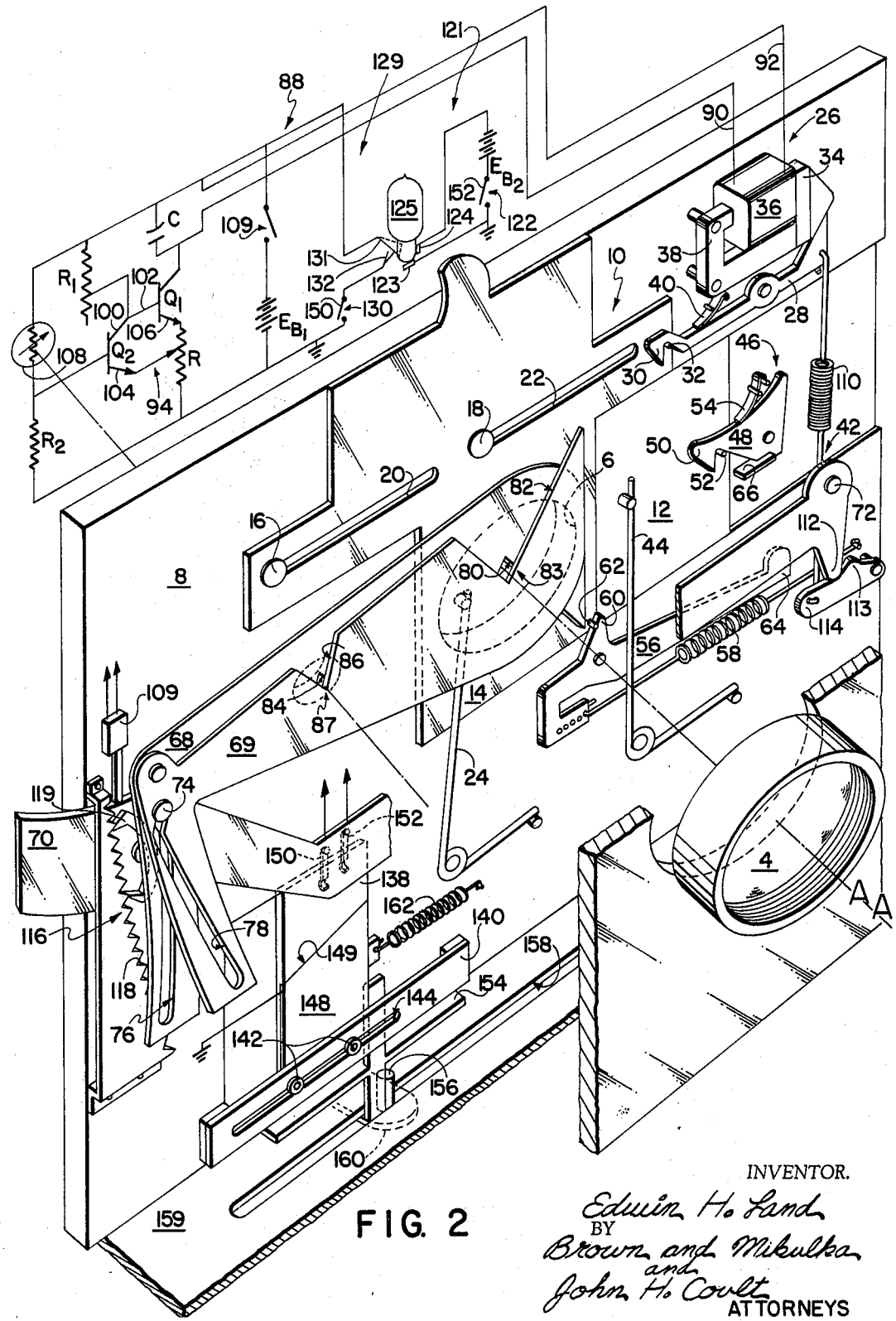

For a fuller understanding of the nature and objects of the invention, reference should be had to the following detailed description taken in connection with the accompanying drawings wherein:

FIGURE 1 is a perspective view of a photographic camera exemplifying a structure with which the invention may be practiced, a portion of the front assembly for the camera being broken away to show certain hidden elements; and FIG. 2 is a diagrammatic view of exposure control apparatus, revealed in part in FIGURE 1, which embodies the principles of the invention.

The drawings illustrate a preferred embodiment of the invention in a photographic camera including a front assembly 3. Referring particularly to FIG. 2, the front assembly 3 may contain an exposure control system including an objective lens 4 for focusing images of the scene to be photographed upon a photosensitive material (not shown) through an exposure aperture 6 in a base plate 8.

A fixed-speed shutter mechanism 10 mounted upon the base plate 8 is illustrated as comprising reciprocably mounted closing and opening blades 12, 14, respectively. The opening blade 14 is mounted to reciprocate on the base plate 8 by means of a pair of pins 16, 18 extending from the base plate 8 which are slidably received in a pair of slots 20, 22 in the opening blade 14. A hairpin-type spring 24 may be provided for urging the opening blade 14 from its light blocking position, as shown, to a light unblocking position away from the exposure aperture 6.

For the purpose of controlling the release of the opening blade 14 for movement thereof from a light blocking position to a light unblocking position, an electromagnetic shutter control device 26 is provided. The control device 26 comprises a latch lever 28 pivotally mounted upon base plate 8 and having a dog 30 on one end thereof adapted to engage a pin 32 projecting from the opening blade 14. A keeper 34 on the opposed end of the latch lever 28 is adapted for magnetic retention by an electromagnet comprising a coil 36 surrounding a low-permeance core 38. A leaf-type return spring 40 may be provided for biasing the latch lever 28 in a counterclockwise direction to return the latch lever 28 to a latching position after disengagement thereof from the pin 32.

The closing blade 12 is illustrated as being slidably mounted within a channel 42 in the base plate 8 for movement under the influence of a hairpin-type spring 44 from a light unblocking position, as shown, to a light blocking position wherein the closing blade 12 overlies the exposure aperture 6.

A latch assembly 46 is provided for retaining the closing blade 12 against the bias of spring 44. The latch assembly 46 may comprise a rotatably mounted arm 48 having a dog 50 for engaging a pin 52 projecting perpendicularly from the closing blade 12. A leaf-type return spring 54 may be provided for returning the arm 48 to its latching position after disengagement from the pin 52.

In order to interpose a predetermined time delay between the release of the opening blade 14 by the control device 26 and the subsequent release of the closing blade 12 by the latch assembly 46, an inertia arm 56 may be provided. When the opening blade 14 is in its blocking position, the inertia arm 56 is prevented from moving in a counterclockwise direction under the force of a spring 58 by the engagement of a radial extension 60 of the arm 56 with a pin 62 projecting transversely from the opening blade 14.

The shutter mechanism 10 is actuated by a de-energization of the control device 26 which causes the pin 32 on opening blade 14 to be disengaged from dog 30 on lever 28. The escape of the opening blade 14 from the control device 26 allows the inertia arm 56 to rotate counterclockwise under the influence of spring 58 until a head 64 on the inertia arm 56 strikes an anvil member on the arm 48, disengaging the dog 50 on arm 48 from the pin 52 on the closing blade 12. The closing blade 12 follows the opening blade 14 to provide a predetermined fixed exposure interval.

In order to effect a release of the opening blade 14 by the control device 26 at an effective exposure aperture according with the scene brightness and the shutter speed and photosensitive material used, shutter control means are provided. The shutter control means may include a pair of cooperating, pivotally mounted diaphragm blades 68, 69 movable relative to each other by means of a manually operable control member 70. The control member 70 (shown broken away between its two ends for clarity) is pivotally mounted on the base plate 8 by means of pin 72 and includes a camming member 74 received in slots 76, 78 in the diaphragm blades 68, 69, respectively, for effecting a displacement of the blades 68, 69 with respect to each other.

The diaphragm blades 68, 69 include a first mating pair of recesses 80, 82, registered with the exposure aperture 6 for defining an aperture 83 constituting the effective exposure aperture for exposing a photosensitive material associated with the described apparatus. A second set of cooperating recesses 84, 86, in the blades 68, 69 define another aperture 87 for controlling the light admitted to an element of the shutter control means to be described hereinafter.

The shutter control means further includes a control circuit 88 for controlling the energization of the coil 36 comprising part of the shutter control device 26. The coil 36 in the control device 26 is connected by means of a pair of leads 90, 92 in the control circuit 88 in series with transistorized switching means 94 and in parallel with a power supply $E_{B1}$. The switching means 94 in the illustrated embodiment of the invention comprises first and second transistors $Q_1$, $Q_2$. The transistor $Q_2$ has its collector electrode 100 connected to the base electrode of transistor $Q_1$ and its emitter electrode 104 connected to the emitter electrode 106 of transistor $Q_1$ such that the bias current fed to transistor $Q_1$ through adjustable resistor $R_1$, and thus the conduction of transistor $Q_1$, is controlled by the resistance, and thus by the state of conduction, of transistor $Q_2$.

The switching means 94, and more directly the transistor $Q_2$ is rendered responsive to the level of scene brightness, receiving its base bias current from a voltage divider comprising a resistor $R_2$ and a photocell 108, or other suitable photoresponsive device, exposed to the scene to be photographed through the aperture 87 in the diaphragm blades 68, 69. The emitter electrode 104 of transistor $Q_2$ may be connected to an adjustable resistor $R_3$ in series with the emitter electrode 106 of $Q_1$ to establish a feedback from transistor $Q_1$ to transistor $Q_2$ which provides a very rapid switching of the conduction from $Q_1$ to $Q_2$ when the base current supplied through the photocell 108 to the base electrode of transistor $Q_2$ reaches a level sufficiently great to bias the transistor $Q_2$ into conduction.

As the control member 70 is manually depressed prior to exposure, the diaphragm blades 68, 69 are moved relative to each other to effect a gradual enlargement of the exposure aperture 83 and also of the photocell aperture 87. A main switch 109 for operably connecting power supply $E_{B1}$ into the control circuit 88 is closed at the initiation of the downstroke of control member 70. When the exposure aperture 83 is appropriate for the scene brightness, for the speed of the shutter mechanism, and for the photosensitive material used, taking into account the various parameters in the exposure control system, the transistor $Q_2$ is triggered into conduction, effecting a rapid switching of transistor $Q_1$ to a non-conducting state. At this instant, the coil 36 is de-energized. Any high current surges which may be caused by induction in the coil 36 are shunted by a capacitor C connected in parallel with the coil 36.

De-energization of the coil 36 produces a rapid demagnetization of the core 38, allowing a spring 110, which is tensioned during the downstroke of control member 70 by the engagement of a camming lobe 112 on the control member 70 with a cam follower lobe 113 on a pivoted arm 114, to draw the latch lever 28 clockwise to free the opening blade 14. As the opening blade 14 moves to its light unblocking position, the inertia arm 56 rotates under the influence of spring 58 into engagement with the anvil member 66 on the latch assembly 46, freeing the closing shutter blade 12 for movement to its light blocking position.

In order that the speed at which the control member 70 is depressed may be rendered relatively invariant, so that variations in depression speed may be substantially eliminated as a factor in determining the effective exposure aperture at which the shutter mechanism 10 is actuated, an escapement mechanism 116 may be provided. The escapement mechanism 116 may include an arcuate escapement rack 118 mounted on the base plate 8 and a pallet 119 pivotally mounted on the control member 70 for oscillatory engagement along the rack 118 upon depression of the control member 70. The escapement mechanism 116 acts to minimize the effect of manual pressure on the control member 70 as a factor in determining the speed at which the control member 70 may be depressed and thus stabilizes the depression speed at a speed relatively independent of the depression force applied.

By a proper selection of the photocell 108 and the value of the resistance $R_2$ and the other parameters in the system, the condition may be established that at levels of scene brightness which are below a predetermined minimum level necessary for a satisfactory exposure of the photosensitive materials employed, insufficient bias current will be fed to transistor $Q_2$, even at the maximum effective exposure aperture, to trip the shutter mechanism 10. With such a condition established, it becomes impossible to underexpose the associated photosensitive material because of insufficient ambient light. Thus, a depression of the control member 70 without the actuation of the shutter mechanism 10 indicates to the operator that insufficient ambient light is available and that a source of artificial illumination, such as a flash bulb, must be used in order to obtain a satisfactory exposure.

For use in low ambient lighting conditions, flash apparatus is provided, for example, as shown at 120. Flash apparatus suitable in the practice of the present invention may include a flash circuit 121 comprising a flash switch 122 in series with a power supply $E_{B2}$ and a pair of flash terminals 123, 124 for receiving a flash bulb 125 (See the circuit diagram in FIG. 2). The structure and operation of the flash switch 122 is described in detail hereinafter.

The invention concerns means for initiating a flash exposure at an effective aperture which is appropriate for the range of the subject to be photographed. The invention contemplates the initiation of the flash exposure by the closing of switch means. Numerous arrangements may be devised by one skilled in the pertinent arts in accordance with the inventive concepts for effecting a coordinated actuation of the flash apparatus 120 and the shutter mechanism 10 in response to the closing of switch means. In the illustrated embodiment a shutter control switch 130 and flash switch 122 are actuated approximately simultaneously to produce a flash exposure, as described below.

To provide means for tripping the shutter mechanism 10 in flash conditions, a shunt 129 may be provided across coil 36 and switch means 94. The shunt 129 may include a shutter control switch 130 in series with a pair of contacts 131, 132 closed by the insertion of a flash bulb 125 in a socket (not shown) provided therefor. In photoflash operations, with a flash bulb 125 operably positioned in the flash bulb socket so as to close contacts 131, 132, closing of the control switch 130 shorts out the power supply $E_{B1}$ feeding coil 36, causing the shutter mechanism 10 to be tripped.

It is desirable in flash photography that the effective aperture at which a flash exposure is made be varied directly with subject distance. By this invention means are provided for effecting a closing of the flash switch 122 to produce a flash exposure at a setting of the diaphragm blades 68, 69 which defines an effective aperture appropriate for the range of the subject to be photographed. Shutter control switch 130 is actuated similarly at approximately the same time.

To this end the diaphrgam blades 68, 69 may be rendered responsive to visually estimated subject distances. In a preferred arrangement, however, the blades 68, 69 may be coupled directly to focusing means for the camera's objective lens 4.

In the illustrated embodiment of the invention, focusing means are provided, comprising articulated upper and lower focusing linkages 133, 134, respectively, coupled to the front assembly 3 of the camera, and a focusing bar 135 manually translatable by means of a pair of opposed push buttons 136 thereon. With the illustrated focusing apparatus, translation of the focusing bar 135 causes the linkages 133, 134 to translate the front assembly 3, and thus the objective lens 4, along the optical axis A—A.

In a shutter control system of the type depicted wherein a control member 70 for actuating the shutter mechanism 10 is coupled to aperture control means, it is desirable in flash applications that a flash exposure be initiated at a point in the locus of travel of the control member 70 which establishes an effective aperture appropriate for the focused subject distance.

To accomplish these ends, by this invention switch actuating means may be provided which are rendered responsive to the control member 70 (and thus to the effective exposure aperture) and to the focusing means for effecting a closing of the shutter control switch 130 and the flash switch 122 at an effective aperture appropriate for the focused distance of the objective lens 4.

Referring now especially to FIG. 2, the switch actuating means may comprise a switching member 138 reciprocably mounted upon a mounting strip 140 by means of pins 142 slideably received in a slot 144 in the strip 140. The switching member 138 may have an electrically conductive insert 148 thereon, which insert 148 is provided with an upper edge 149 angled obliquely relative to the locus of travel of the control member 70.

Although numerous arrangements may be provided for effecting actuation of the switches 122 and 130, in the illustrated preferred arrangement, a pair of wiper-type contacts 150, 152 comprising elements of switches 122, 130, respectively, may be mounted upon and insulated from member 70, being positioned so as to simultaneously engage the electricaly conductive insert 148 on the switching member 138 when the control member 70 is depressed. It is evident that the point in the locus of travel of the control member 70 at which the electrically conductive insert 148 engages contacts 150, 152 is dependent upon the position of the switching member 138 relative to the locus of travel of contacts 150, 152. When the switching member 138 is located, for example, at the left end (in FIG. 2) of the slot 144 in strip 140, the contacts 150, 152 engage the insert 148 at a point in the locus of travel of the control member 70 corresponding to a smaller effective exposure aperture than when the switching member 138 is disposed at the right end of the slot 144.

Means may be provided for altering the position of the switching member 138 in accordance with changes in the focused distance. Such means may take the form shown in FIG. 2, comprising a slidable coupling member 154 acted upon by a pin 156 projecting upwardly through a slot 158 in a bottom wall 159 of the front assembly housing from a linkage arm 160 comprising part of the lower focusing linkage 134. A spring 162 may be provided for maintaining the coupling member 152 in engagement with the pin 156 at all times during a focusing operation.

It is evident from the drawings and the above description that focus adjustments in the position of objective lens 4 by the focusing means causes the switching member 138 to be displaced by the pin 156 on linkage arm 160. By a proper selection of the relevant parameters in the apparatus, the condition may be readily established by one skilled in the art wherein the control and flash switches 130, 122 are closed and thus the shutter mechanism actuated and the flash fired at an effective exposure aperture appropriate for the particular focused distance.

Certain changes may be made in the above apparatus without departing from the scope of the invention herein involved. For example, as suggested above, rather than coupling switch actuating means such as switching member 138 focusing means for the objective lens 4, such a member 138 might be coupled to means manually set in accordance with visually estimated subject distances. Such an application of the invention would be particularly useful in a fixed-focus camera.

Numerous other modified or equivalent structures might be devised in accordance with the principles of the invention by those skilled in the related arts. It is therefore intended that all matter contained in the above description or shown in the accompanying drawings shall be interpreted as illustrative and not in a limiting sense.

What is claimed is:

1. In a photographic camera including an exposure aperture on an optical axis for exposing photosensitive material, the combination comprising:
   variable diaphragm means on said optical axis for defining a range of effective exposure apertures;
   control means coupled to said diaphragm means for effecting a progressive variation in the effective exposure aperture defined by said diaphragm means;
   exposure means including flash means for effecting a flash-illuminated exposure through said exposure aperature of photosensitive material on said optical axis;
   adjustable means positionable in accordance with the range of the selected subject to be photographed; and
   actuating means responsive to said control means and to said adjustable means for effecting actuation of said exposure means at various settings of said diaphragm means dependent upon the setting of said adjustable means.

2. The combination defined by claim 1 including objective lens means on said optical axis, said adjustable means including focusing means for effecting focus adjustments of said objective lens means.

3. The combination defined by claim 1 including switch means, said exposure means being actuated in response to the closing of said switch means, said actuating means comprising switch actuating means effective to close said switch means to actuate said exposure means.

4. The combination defined by claim 3 including objective lens means on said optical axis, said adjustable means including focusing means for effecting focus adjustments of said objective lens means.

5. The combination defined by claim 4 wherein said switch actuating means includes a switching member variably positionable in response to adjustments in said focusing means for engagement with said control means to actuate said switch means at various points on the locus of travel of said control means defining effective apertures appropriate for the respective focused distances of said focusing means.

6. The combination defined by claim 5 wherein said switching member has an edge engageable with said control means and wherein said focusing means includes means for moving said switching member such that said edge moves transversely across the locus of travel of said control means at an oblique angle with respect to said locus of travel such that adjustments in the position of said switching member responsive to focus adjustments of said focusing means alters the point in the locus of travel of said control means at which said edge is engaged.

7. The combination defined by claim 5 wherein said switching member includes electrically conductive means having said edge.

8. The combination defined by claim 7 wherein said switch means includes contact means carried on said control means for electrical engagement with said electrically conductive means on said switching member.

9. In a photographic camera including an exposure aperture on an optical axis for exposing photosensitive material, the combination comprising:

objective lens means on said optical axis;

variable diaphragm means on said optical axis for defining a range of effective exposure apertures;

movable control means coupled to said diaphragm means for effecting a progressive variation in the effective exposure aperture defined by said diaphragm means;

exposure means including switch means and including shutter means and flash means actuatable in response to the closing of said switch means for effecting a flash-illuminated exposure through said exposure aperture of photosensitive material on said optical axis;

focusing means for effecting focus adjustments of said objective lens means; and switch actuating means including a switching member having an edge engageable with said control means to actuate said switch means, said focusing means including means for moving said switching member such that said edge moves transversely across the locus of travel of said control means at an oblique angle with respect to said locus of travel, adjustments in the position of said switching member responsive to focus adjustments of said focusing means altering the point in the locus of travel of said control means at which said edge is engaged such that said switch means is actuated at an effective aperture appropriate for the respective focused distance.

References Cited

UNITED STATES PATENTS

| | | | |
|---|---|---|---|
| 3,121,379 | 2/1964 | Macomber et al. | 95—64 |
| 3,185,060 | 5/1965 | Borghesani | 95—45 |
| 3,257,920 | 6/1966 | Greger et al. | 95—11 |
| 3,296,947 | 1/1967 | Engelsmann et al. | 95—11.5 XR |

NORTON ANSHER, Primary Examiner

F. L. BRAUN, Assistant Examiner

U.S. Cl. X.R.

95—64